United States Patent
Bae et al.

(10) Patent No.: US 8,413,232 B2
(45) Date of Patent: Apr. 2, 2013

(54) TERMINAL AND METHOD FOR CONTROLLING THEREOF

(75) Inventors: Yu-Seok Bae, Daejeon (KR); Bong-Jin Oh, Daejeon (KR); Kyeong-Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 211 days.

(21) Appl. No.: 12/908,407

(22) Filed: Oct. 20, 2010

(65) Prior Publication Data

US 2011/0138459 A1    Jun. 9, 2011

(30) Foreign Application Priority Data

Dec. 8, 2009   (KR) .................... 10-2009-0121191

(51) Int. Cl.
*G06F 7/04* (2006.01)
(52) U.S. Cl. ........................................................ 726/19
(58) Field of Classification Search .................. 726/4–6, 726/17–19, 28, 29; 713/186, 183; 380/26
See application file for complete search history.

(56) References Cited

U.S. PATENT DOCUMENTS

| | | | |
|---|---|---|---|
| 2003/0028872 A1* | 2/2003 | Milovanovic et al. | 725/12 |
| 2003/0108227 A1* | 6/2003 | Philomin et al. | 382/124 |
| 2008/0062337 A1* | 3/2008 | Maier | 348/734 |
| 2008/0238709 A1* | 10/2008 | Vaziri et al. | 340/825.22 |
| 2009/0146779 A1* | 6/2009 | Kumar et al. | 340/5.31 |
| 2010/0060418 A1* | 3/2010 | Tarizzo | 340/5.83 |

FOREIGN PATENT DOCUMENTS

| | | |
|---|---|---|
| JP | 2000-244830 | 9/2000 |
| JP | 2008-167184 | 7/2008 |
| KR | 1020060095171 | 8/2006 |
| KR | 1020080025799 | 3/2008 |
| KR | 1020090075210 | 7/2009 |

* cited by examiner

*Primary Examiner* — Beemnet Dada
(74) *Attorney, Agent, or Firm* — Nelson Mullins Riley & Scarborough LLP; EuiHoon Lee, Esq.

(57) ABSTRACT

Disclosed are a terminal and a method for controlling thereof that load a user authorization function in a terminal such as a remote controller that remotely controls an external display apparatus such as a TV, etc. and allow only users who accept user authorization to use the display apparatus.

4 Claims, 17 Drawing Sheets

FIG. 16
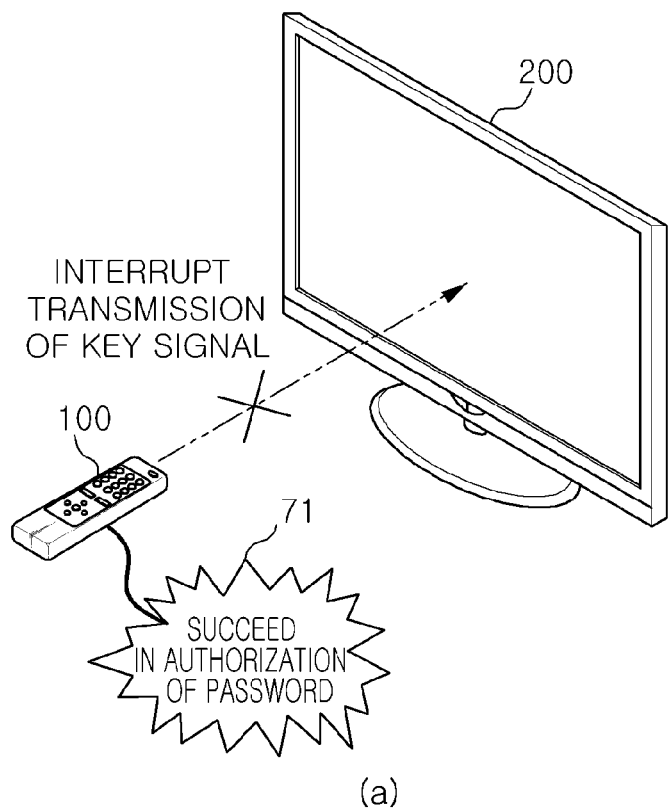
(a)
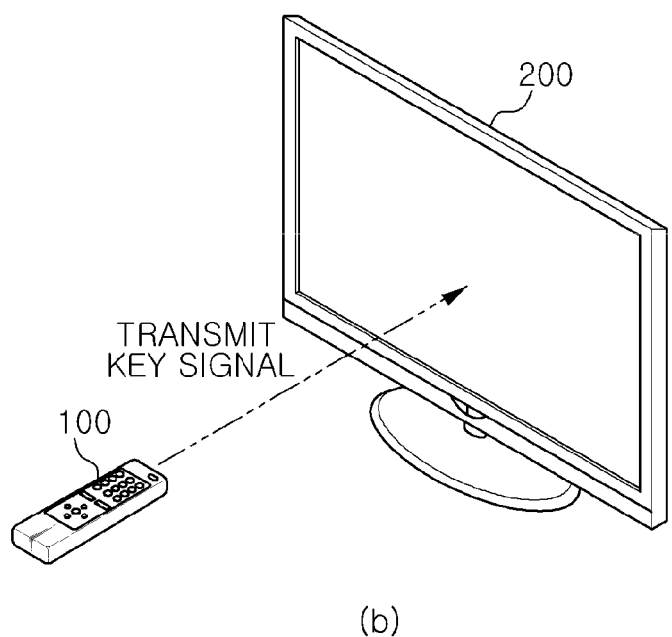
(b)

FIG. 17
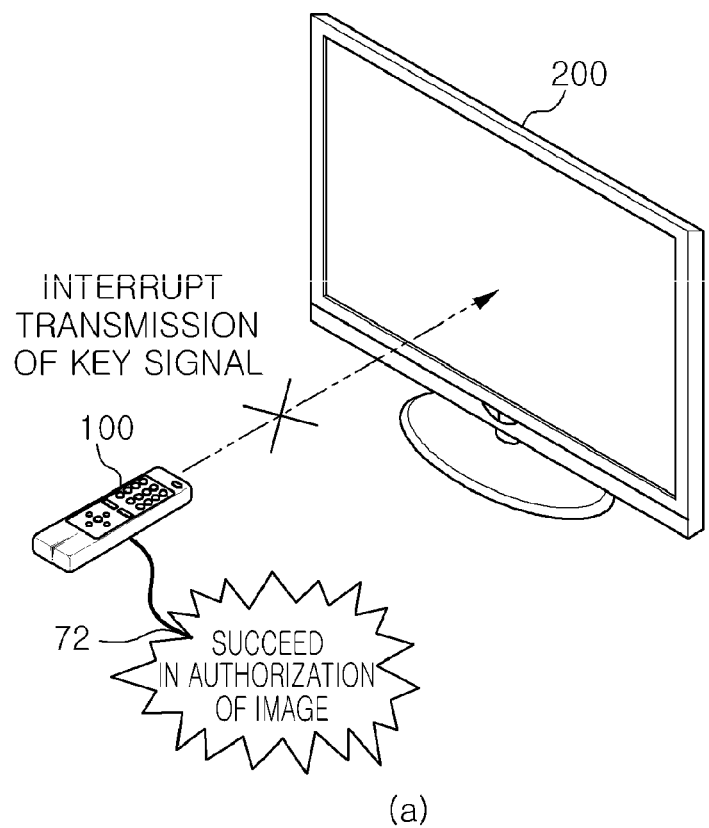
(a)
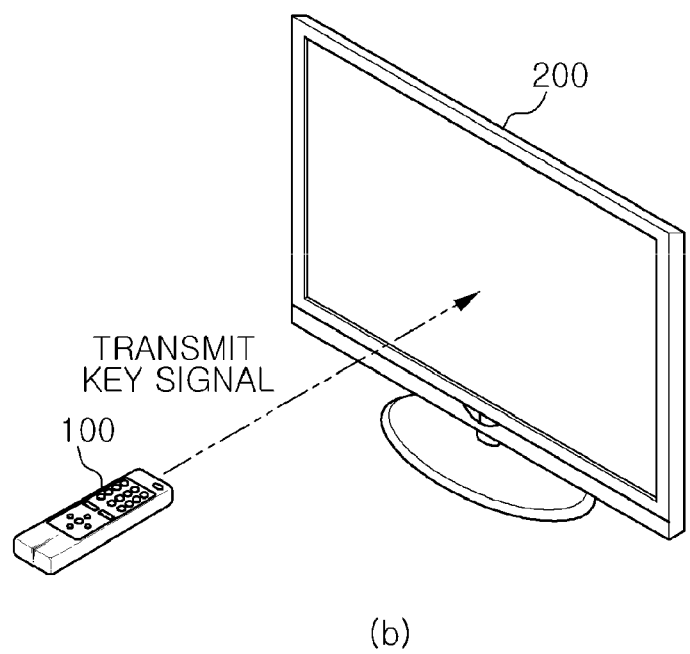
(b)

FIG. 18
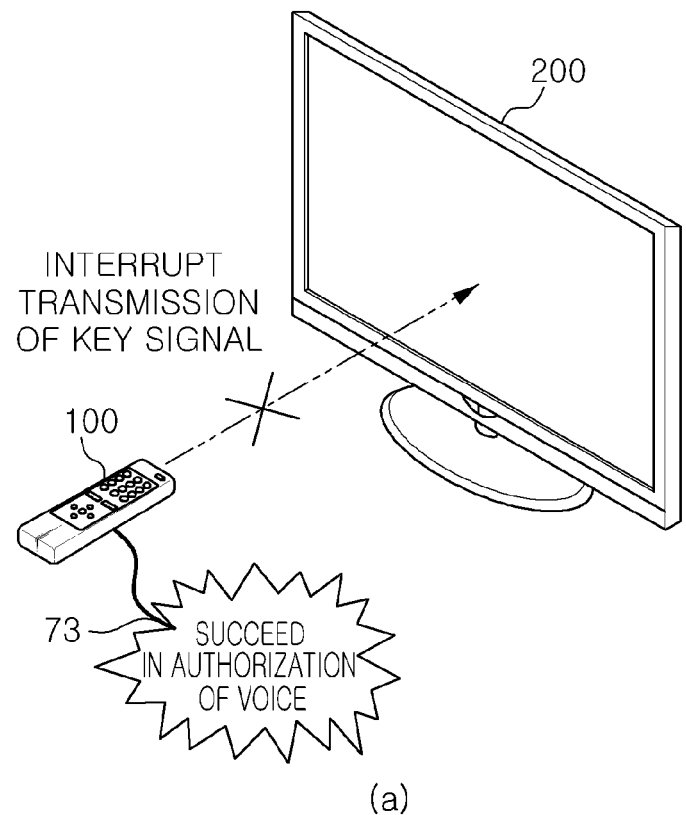
(a)
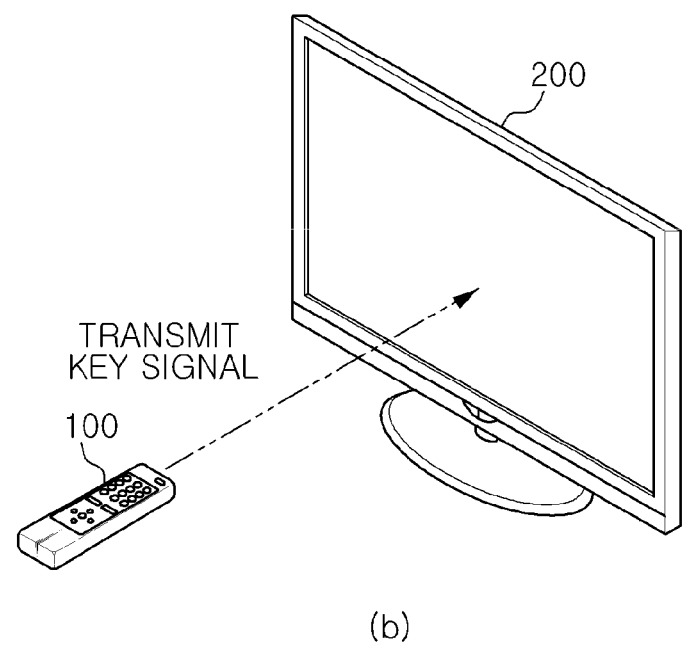
(b)

FIG. 19
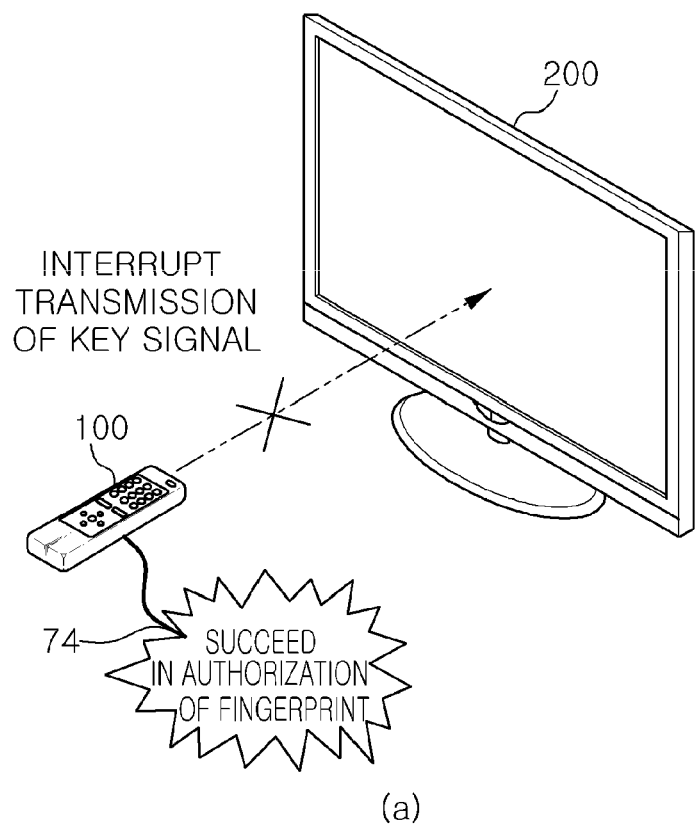
(a)
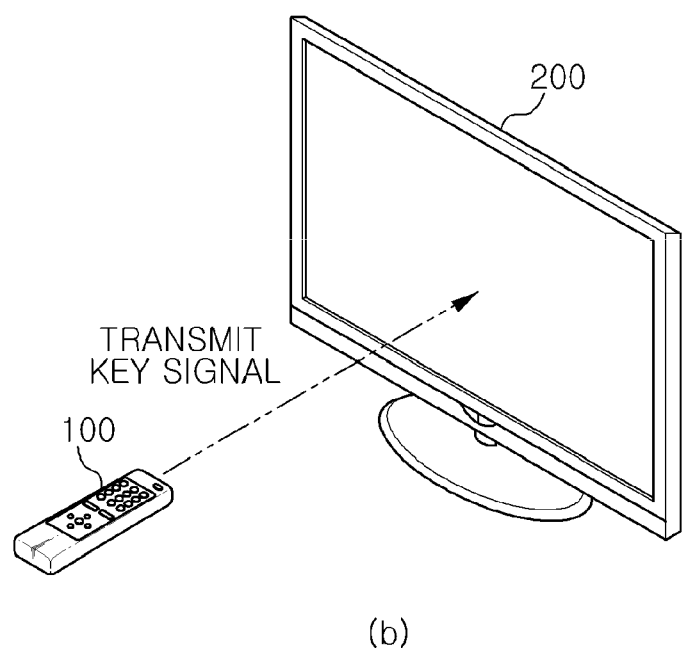
(b)

FIG. 20
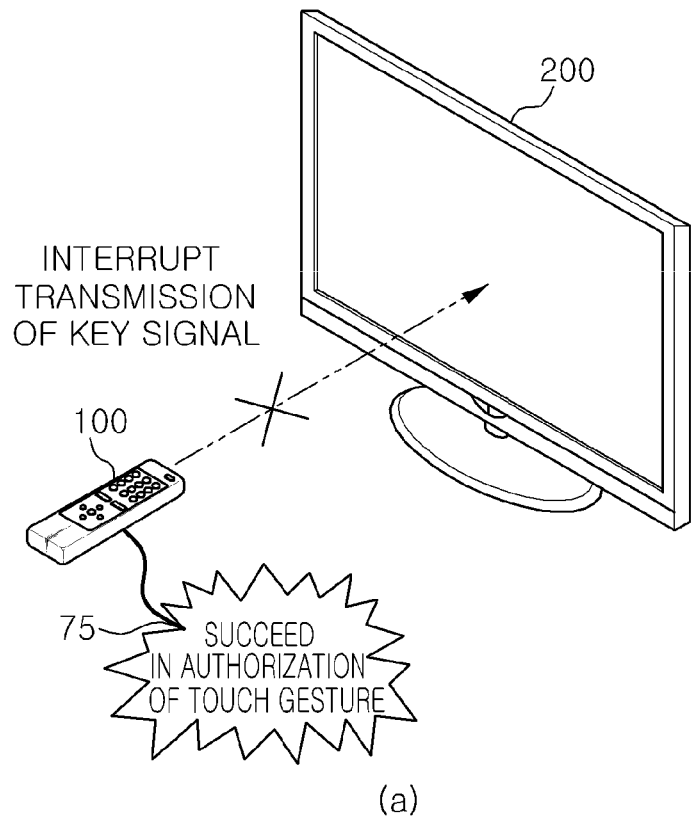
(a)
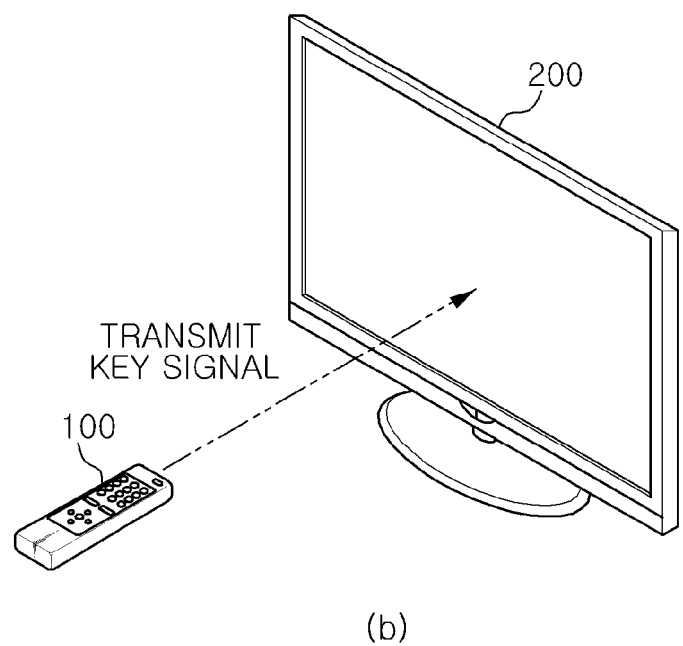
(b)

FIG. 21
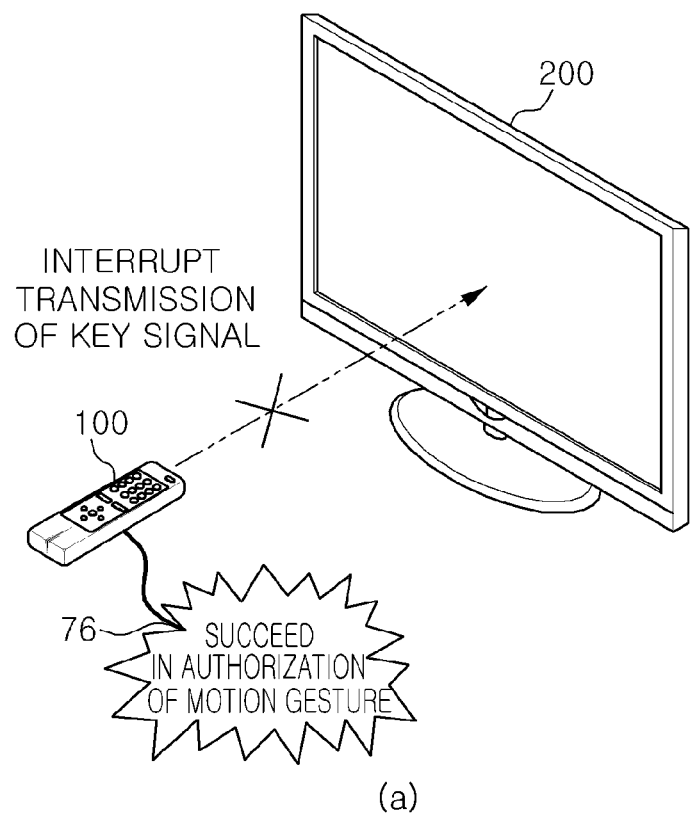
(a)
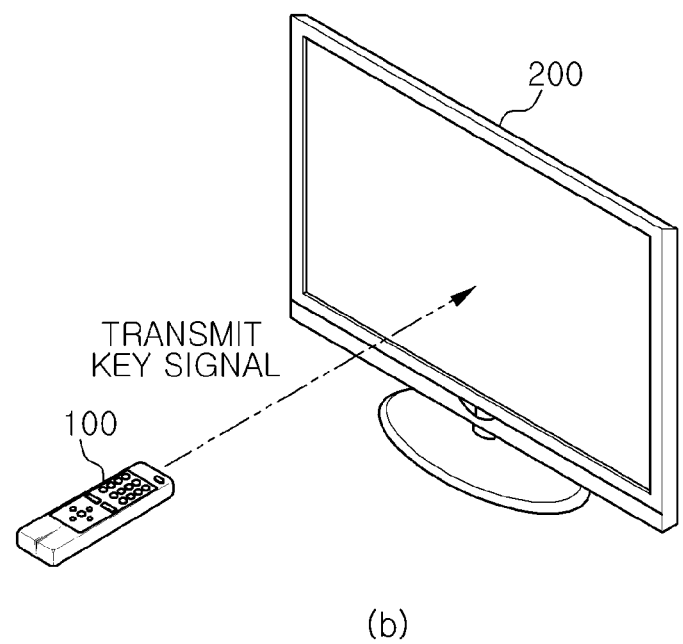
(b)

TERMINAL AND METHOD FOR CONTROLLING THEREOF

CROSS REFERENCE TO RELATED APPLICATIONS

This application claims priority to Korean Patent Application No. 10-2009-0121191 filed on Dec. 8, 2009, the entire contents of which are herein incorporated by reference.

BACKGROUND OF THE INVENTION

1. Field of the Invention

The present invention relates to a terminal and a method for controlling thereof. More particularly, the present invention relates to a terminal remotely controlling an external display apparatus such as a television and a method for controlling thereof.

2. Description of the Related Art

In general, in the case of a TV having various drawn-up programs and a lot of viewing channels unlike a computer having a lot of security programs in order to protect adolescent from harmful websites, the adolescents consciously or unconsciously watch indecent broadcasting programs whenever operate a remote controller in order to set channels and in addition, children who are lack in judgment are exposed to the indecent broadcasting programs in the state in which there is provided no system capable of thoroughly interrupting watching except for a warning message to limit a watching age.

SUMMARY OF THE INVENTION

In order to solve the above-mentioned problem, there is an object of the present invention to provide a terminal and a method for controlling thereof that load a user authorization function in a terminal such as a remote controller that remotely controls an external display apparatus such as a TV, etc. and allow only users who accept user authorization to use the display apparatus.

In order to achieve the above-mentioned object, according to an aspect of the present invention, there is provided a terminal that includes: an input unit generating a key signal for remotely controlling an external display apparatus; a wireless communication unit transmitting the key signal generated from the input unit to the external display apparatus; a memory storing authorization information of a person who is permitted to use the external display apparatus; an authorization unit performing authorization of a predetermined person who is permitted to use the external display apparatus by using the authorization information stored in the memory; and a control unit permitting transmission of the key signal for remotely controlling the external display apparatus inputted from the input unit when the authorization is performed successfully through the authorization unit.

In this case, the control unit may interrupt transmission of the key signal until the authorization is performed successfully when the authorization is failed.

Further, the control unit may interrupt transmission of the key signal inputted from the input unit when information for notifying restriction of using the external display apparatus received from the external display apparatus through the wireless communication unit.

In addition, the authorization information may be a password set by the person who is permitted to use the external display apparatus and the authorization unit may notify authorization success of the person to the control unit when the a key signal inputted through the input unit coincides with the password.

Moreover, the authorization information may be an image of the person who is permitted to use the external display apparatus and the authorization unit may include a camera that acquires an image of a person. In this case, the authorization unit may notify the authorization success of the person to the control unit when an image of a person inputted through the camera coincides with the image of the person who is permitted to use the external display apparatus.

Besides, the authorization information may be a voice of the person who is permitted to use the external display apparatus and the authorization unit may include a microphone that receives a voice of a person. In this case, the authorization unit may notify the authorization success to the control unit when a voice of a person inputted through the microphone coincides with the voice of the person who is permitted to use the external display apparatus.

Further, the authorization information may be a fingerprint of the person who is permitted to use the external display apparatus and the authorization unit may include a fingerprint reader that receives a fingerprint of a person. In this case, when a fingerprint of a person inputted through the fingerprint reader coincides with the fingerprint of the person who is permitted to use the external display apparatus, the authorization unit may notify the authorization success to the control unit.

In addition, the authorization information may be a touch gesture of the person who is permitted to use the external display apparatus and the authorization unit may include a touch screen that receives a touch gesture of a person. In this case, when a touch gesture of a person inputted through the touch screen coincides with the touch gesture of the person who is permitted to use the external display apparatus, the authorization unit may notify the authorization success to the control unit.

Moreover, the authorization information may be a motion gesture of the person who is permitted to use the external display apparatus and the authorization unit may include a motion sensor that receives a motion gesture of a person. In this case, when a motion gesture of a person inputted through the motion sensor coincides with the motion gesture of the person who is permitted to use the external display apparatus, the authorization unit may notify the authorization success to the control unit.

Further, according to another aspect of the present invention, there is a method for controlling a terminal remotely controlling an external display apparatus that includes: interrupting transmission of a key signal for remotely controlling the external display apparatus when information for restriction of using the external display apparatus is received from the external display apparatus; performing authorization of a predetermined person who is permitted to use the external display apparatus by using authorization information stored in a memory; and permitting transmission of the key signal to the external display apparatus when the authorization is performed successfully.

According to an embodiment of the present invention, a terminal and a method of controlling thereof can prevent infants, adolescents, etc. from indiscreetly watching adult broadcasts by loading a user authorization function in a terminal such as a remote controller that remotely controls an external display apparatus such as a TV, etc. and allowing only users who accept user authorization to use the display apparatus.

BRIEF DESCRIPTION OF THE DRAWINGS

FIG. 15 is a flowchart showing a process for a terminal to limit and permit using a display apparatus according to an exemplary embodiment of the present invention and FIGS. 16 to 21 are explanatory diagrams showing a process for a terminal to limit and permit using a display apparatus according to an exemplary embodiment of the present invention.

DETAILED DESCRIPTION OF THE PREFERRED EMBODIMENTS

Hereinafter, a terminal according to an exemplary embodiment of the present invention will be described in more detail with reference to the accompanying drawing.

The terminal according to the exemplary embodiment of the present invention may be implemented in various forms. For example, the terminal disclosed in this specification as a communicable terminal capable of remotely controlling an external apparatuses including a TV, a monitor, etc., may include all apparatuses including a remote controller, a cellular phone, a personal digital assistants (PDA), a portable multimedia player (PMP), a navigation, a notebook, a PC, etc.

Figure 1:
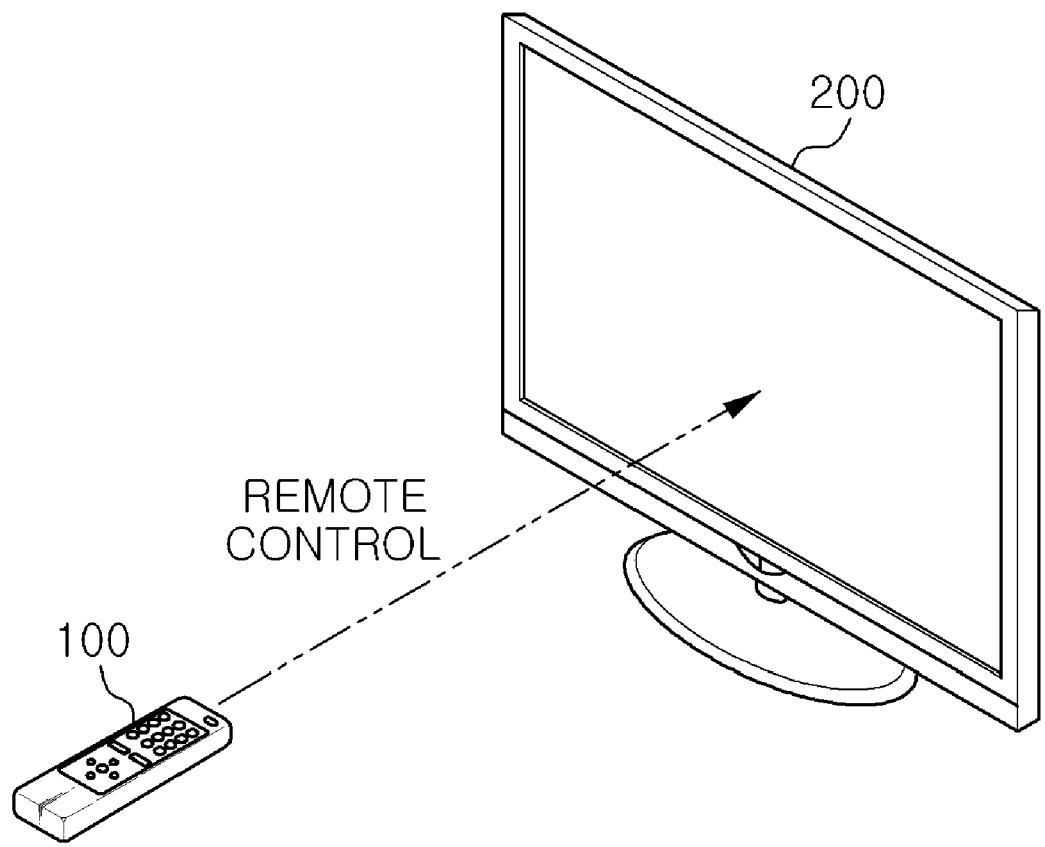
FIG. 1 is a diagram showing a system according to an exemplary embodiment of the present invention.

FIG. 1 is a diagram showing a system according to an exemplary embodiment of the present invention.

Referring to FIG. 1, the system according to the exemplary embodiment of the present invention includes an external display apparatus 200 and a terminal 100 remotely controlling the display apparatus 200 by transmitting a key signal for remotely controlling the display apparatus to the display apparatus 200.

In this case, when the display apparatus 200 receives the key signal from the terminal 100, the display apparatus 200 performs an operation corresponding to the key signal. As one example, when the key signal received from the terminal 100 is a key signal for changing a broadcasting channel, a broadcasting channel which is being presently played is changed to a subsequent broadcasting channel.

Figure 2:
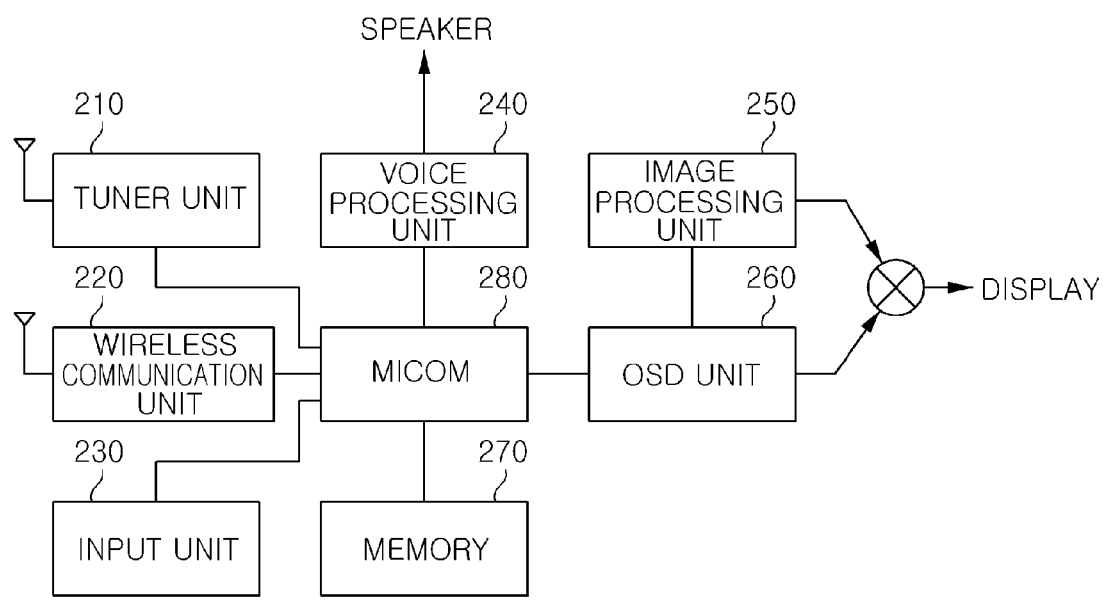
FIG. 2 is a functional block diagram showing a external display apparatus according to an exemplary embodiment of the present invention.

FIG. 2 is a functional block diagram showing a external display apparatus according to an exemplary embodiment of the present invention.

Referring to FIG. 2, the external display apparatus 200 includes a tuner unit 210, a wireless communication unit 220, an input unit 230, a voice processing unit 240, an image processing unit 250, an OSD unit 260, a memory 270, and a microcomputer (MICOM) 280.

The tuner unit 210 tunes the present channel to a channel selected by a user through the input unit 230 to select a broadcasting signal in accordance with a control of the microcomputer 280.

The wireless communication unit 220 receives the key signal for remotely controlling the display apparatus 200 from the terminal 100. Further, when the user operates the input unit 230 to set up a usage restriction function of the display apparatus 200 in accordance with the present invention, the wireless communication unit 220 transmits information for notifying restriction of using the display apparatus 200 to the terminal 100 to allow the terminal 100 to perform authorization of a person who is presently operating the current terminal 100.

The input unit 230 is provided with a plurality of key buttons for controlling functions of the display apparatus 200 to generate key signals depending on inputting the key buttons.

The voice processing unit 240 signal-processes audio data in the broadcasting signal selected by the tuner unit 210 and outputs it through a speaker in accordance with the control of the microcomputer 280.

The image processing unit 250 signal-processes video data in the broadcasting signal selected by the tuner unit 210 and outputs an image in accordance with the control of the microcomputer 280.

The OSD unit 260 generates an OSD screen constituted by a text and a screen, and overlays and displays the generated OSD screen on the screen in accordance with the control of the microcomputer 280.

The memory 270 stores broadcast-related data reproduced by the display apparatus 200 or a program for controlling the display apparatus 200.

The microcomputer 280 controls overall functions of the display apparatus 200 and in particular, controls the function of the display apparatus 200 in accordance with the key signal received from the terminal 100 and stores information on a previous reception channel and a preference channel, set-up information of the display apparatus 200, etc., in the memory 270.

Further, when the usage restriction function of the display apparatus 200 is received from the user, the microcomputer 280 displays information for notifying the usage restriction of the display apparatus 200 on the screen, transmits the information for notifying the usage restriction of the display apparatus 200 to the terminal 100 through the wireless communication unit 220, and allows the terminal 100 to perform authorization of the person who is presently operating the terminal 100.

Figure 3:
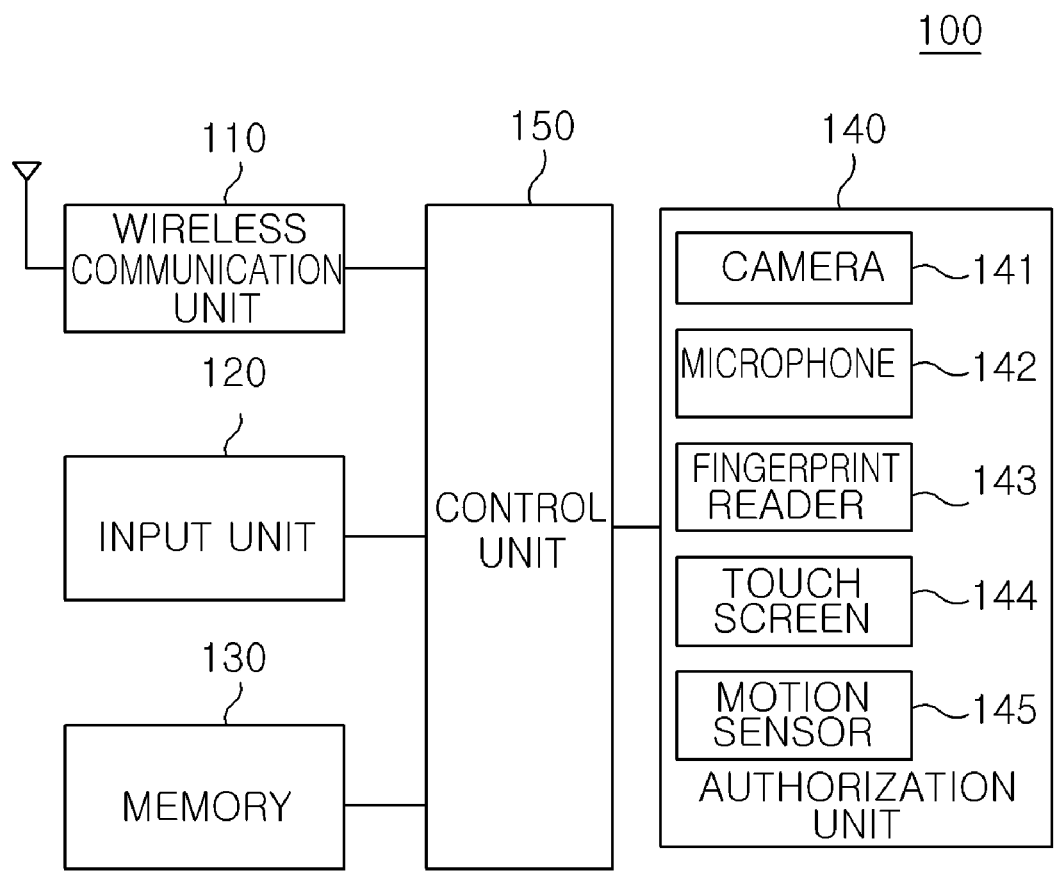
FIG. 3 is a functional block diagram showing a terminal according to an exemplary embodiment of the present invention.

FIG. 3 is a functional block diagram showing a terminal according to an exemplary embodiment of the present invention.

Referring to FIG. 3, the terminal 100 according to the exemplary embodiment of the present invention includes a wireless communication unit 110, an input unit 120, a memory 130, an authorization unit 140, and a control unit 150.

The components shown in FIG. 3 are not essential. Therefore, the terminal 100 may have components more than or less than the components shown in FIG. 3.

Hereinafter, the components will be described in sequence.

The wireless communication unit 110, which wirelessly communicates with the display apparatus 200, transmits the key signal for remotely controlling the display apparatus 200, which is inputted from the input unit 120 to the display apparatus 200 in accordance with a control of the control unit 150 and receives the information for notifying the usage restriction of the display apparatus 200 from the display apparatus 200.

The wireless communication unit 110 may be provided with at least one module of modules for short-range wireless communication such as infrared data association (hereinafter, referred to as 'IrDA'), Bluetooth, Zigbee, wireless LAN, and ultra-wideband (UWB).

The input unit 120 generates the key signal for the user to remotely control the display apparatus 200. The input unit 120 may be constituted by a key pad dome switch, a touch pad (hydrostatic/electrostatic), a jog wheel, a jog switch, etc.

The memory 130 may store a program for processing and controlling operations of the control unit 150 or the set-up information of the terminal 100, etc.

Further, the memory 130 stores authorization information on a person who is authorized to use the display apparatus 200 according to the exemplary embodiment of the present invention.

In this case, the authorization information of the person may include a password set by the person who is permitted to use the display apparatus 200, an image of the person, voice of the person, a fingerprint of the person, a touch gesture of the person, a motion gesture of the person, etc.

As one example, the user inputs and stores the password by operating the input unit 130 to set up the authorization information of the person.

A process of setting up the authorization information of the person will now be described in detail with reference to FIGS. 4 to 14.

Further, the memory 130 may include at least one type of storage medium of a flash memory type, a hard disk type, a multimedia card micro type, a card type memory (i.e., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The authorization unit 140 is driven depending on the control of the control unit 150 and authorizes permission of using the display apparatus 200 for a person who presently grips the terminal 100 by using the authorization information of the persons stored in the memory 130.

The authorization unit 140 includes a camera 141 for inputting an image of a person who will be permitted to use the display apparatus 200, a microphone 142 for voice of the person who will be permitted to use the display apparatus 200, a fingerprint reader 143 for inputting a fingerprint of the person who will be permitted to use the display apparatus 200, a touch screen 144 for inputting a touch gesture of the person who will be permitted to use the display apparatus 200, and a motion sensor 145 for inputting a motion gesture for a main body of the terminal 100 of the person who will be permitted to use the display apparatus 200. In this case, the motion sensor 145 may be an acceleration sensor.

The control unit 150 controls the overall operations of the terminal 100 and when the control unit 150 receives the information for notifying the usage restriction of the display apparatus 200 from the wireless communication unit 110, the control unit 150 controls the wireless communication unit 110 to intercept transmission of the key signal transmitted the display apparatus 200.

In the state in which transmission of the key signal to the display apparatus 200 is interrupted, when the person who grips the terminal 100 is authorized by the authorization unit 140, the control unit 150 permits transmission of the key signal.

Hereinafter, referring to FIGS. 4 to 14, the set-up process of the person will be described in detail.

Figure 4:
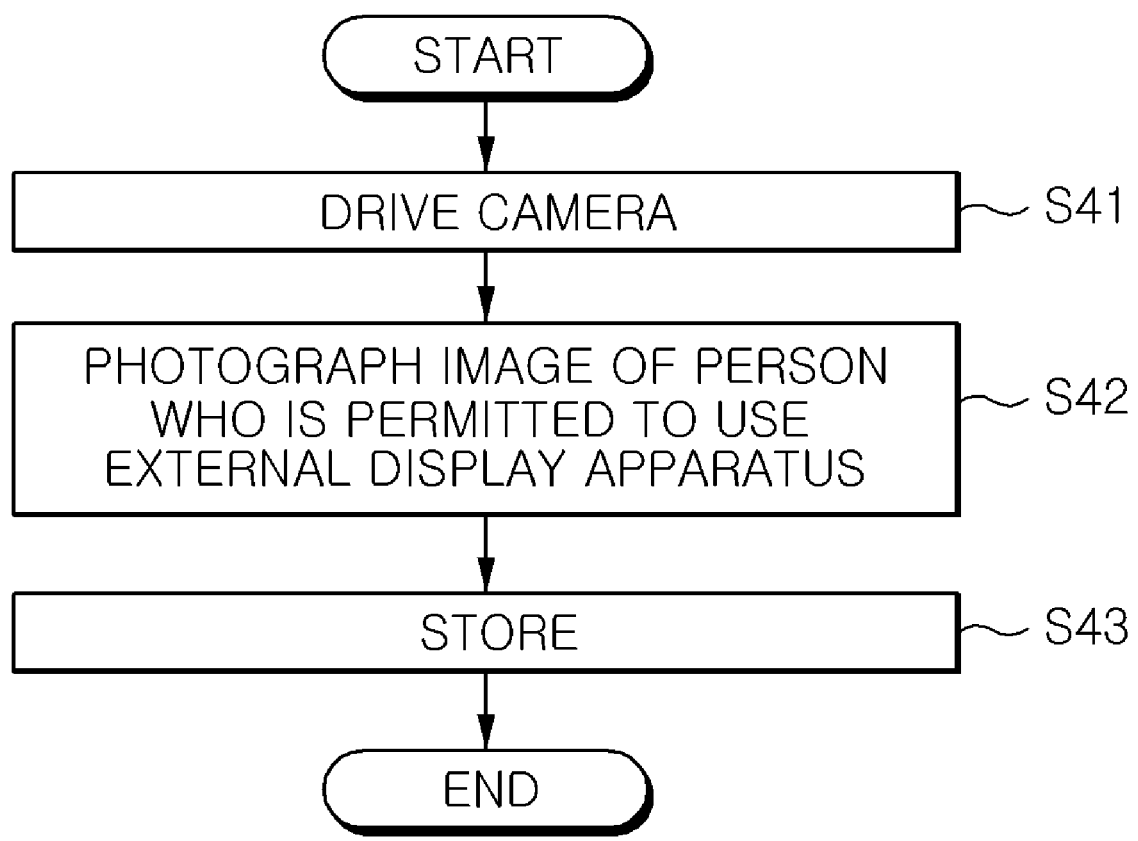
FIG. 4 is a flowchart showing a process of setting up image authorization information of a person who is permitted to use a display apparatus by using a camera.

FIG. 4 is a flowchart showing a process of setting up image authorization information of a person who is permitted to use a display apparatus by using a camera. In addition, FIGS. 5 and 6 are screen state diagrams showing a process of setting up image authorization information of a person who is permitted to use a display apparatus by using a camera.

Figure 5:
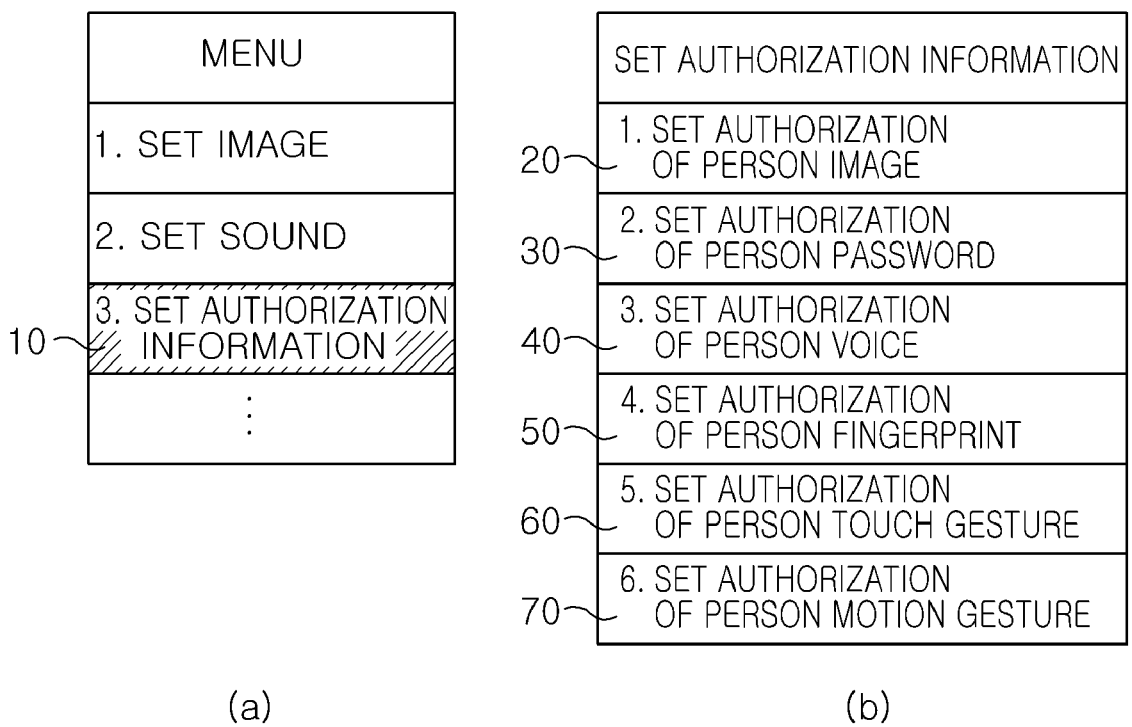
FIGS. 5 and 6 are screen state diagrams showing a process of setting up image authorization information of a person who is permitted to use a display apparatus by using a camera.
Figure 6:
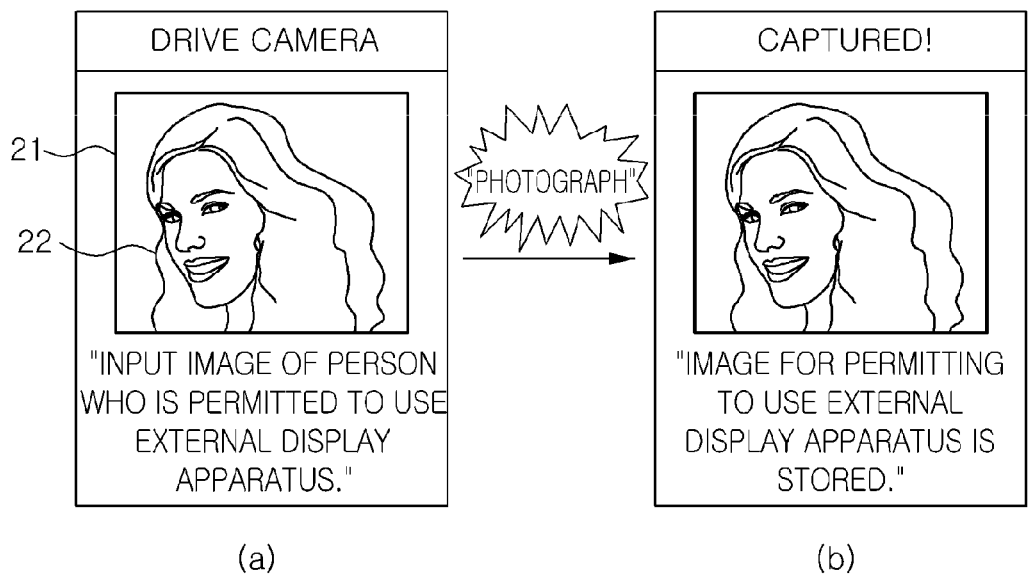

Referring to FIGS. 4 to 6, when an authorization information set-up menu 10 of a person who will be permitted to use a display apparatus 200 is selected by a predetermined person through an input unit 120 (FIG. 5A), a control unit 150 displays a submenu for selecting a set-up scheme of authorization information (FIG. 5B).

In this case, when an image authorization set-up menu 20 is selected from the input unit 120 (FIG. 5B), the control unit 150 drives a camera 141 (S41) (FIG. 6A).

When a photographing command of an image 22 is inputted while an image 22 of a person inputted from the camera 141 is displayed on a preview screen 21 (S42) (FIG. 6A), the control unit 150 stores the image 22 in a memory 130 as the authorization information (S43) (FIG. 6B).

Figure 7:
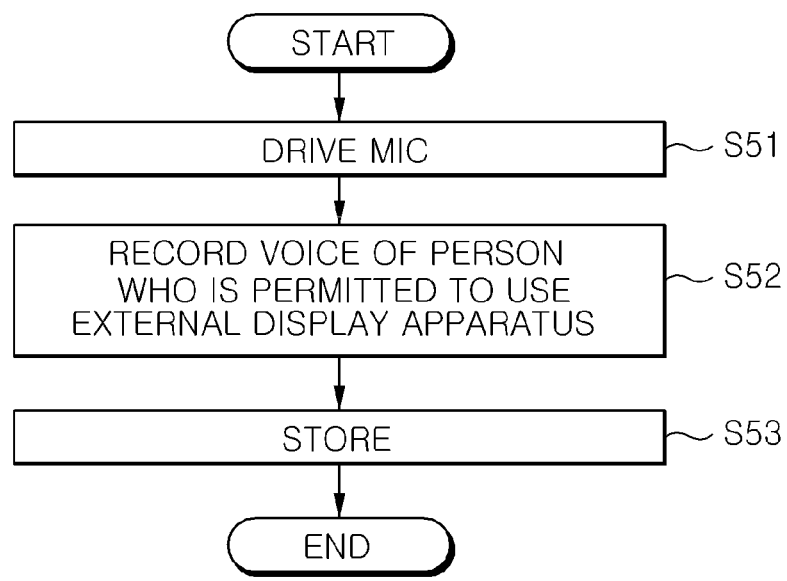
FIG. 7 is a flowchart showing a process of setting up voice authorization information of a person who is permitted to use a display apparatus by using a microphone.

FIG. 7 is a flowchart showing a process of setting up voice authorization information of a person who is permitted to use a display apparatus by using a microphone.

Figure 8:
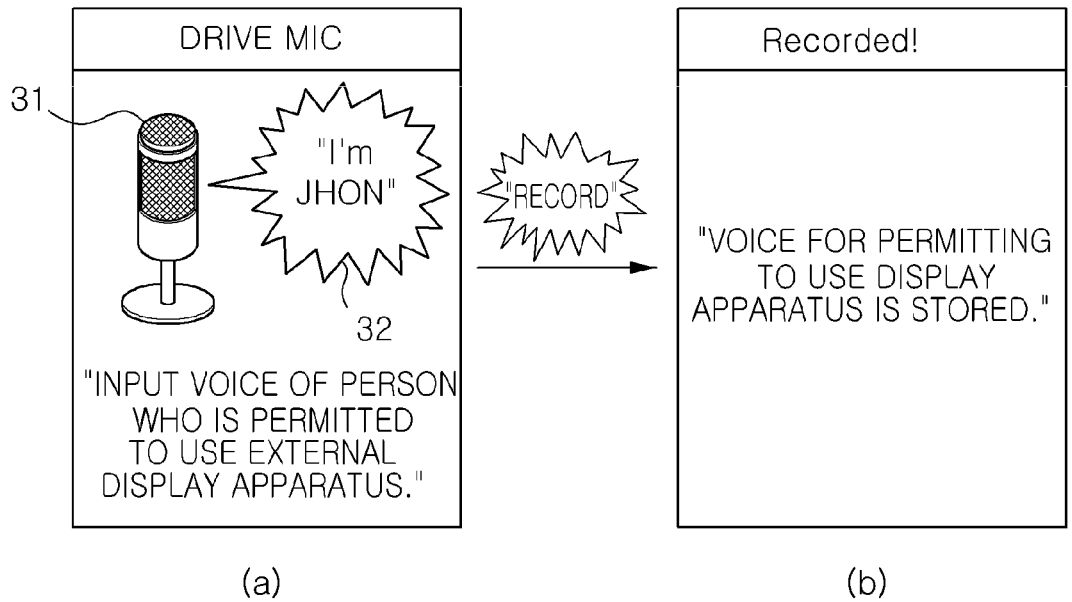
FIG. 8 is a screen state diagram showing a process of setting up voice authorization information of a person who is permitted to use a display apparatus by using a microphone.

FIG. 8 is a screen state diagram showing a process of setting up voice authorization information of a person who is permitted to use a display apparatus by using a microphone.

Referring to FIGS. 7 and 8, when a voice authorization set-up menu 40 is selected from the input unit 120 (FIG. 5B), the control unit 150 drives the microphone 142 (S51) (FIG. 8A).

When a recording command of a voice 32 is inputted (S52) while the voice 32 of the person is inputted from the microphone 142 (FIG. 8A), the control unit 150 stores the voice 32 in the memory 130 as the authorization information (S53) (FIG. 8B).

Figure 9:
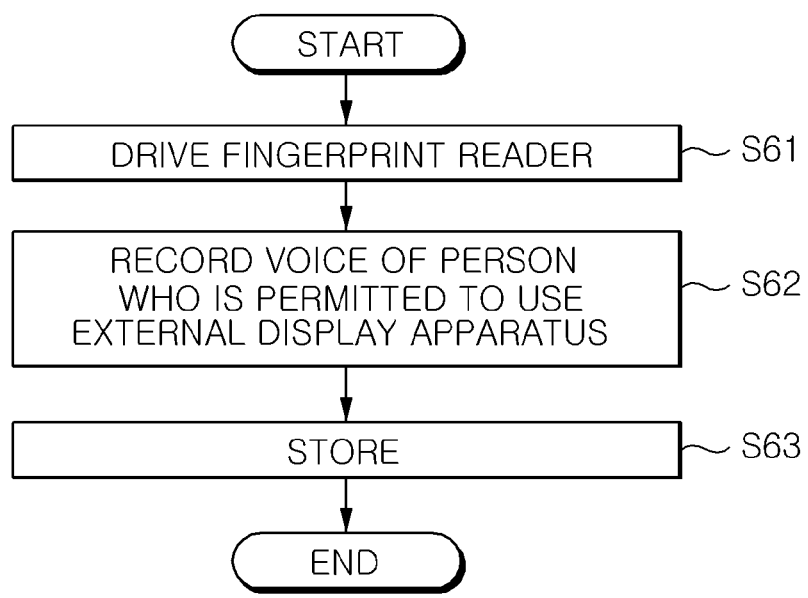
FIG. 9 is a flowchart showing a process of setting up fingerprint authorization information of the person who is permitted to use the display apparatus by using a fingerprint reader.

FIG. 9 is a flowchart showing a process of setting up fingerprint authorization information of a person who is permitted to use the display apparatus by using a fingerprint reader.

Figure 10:
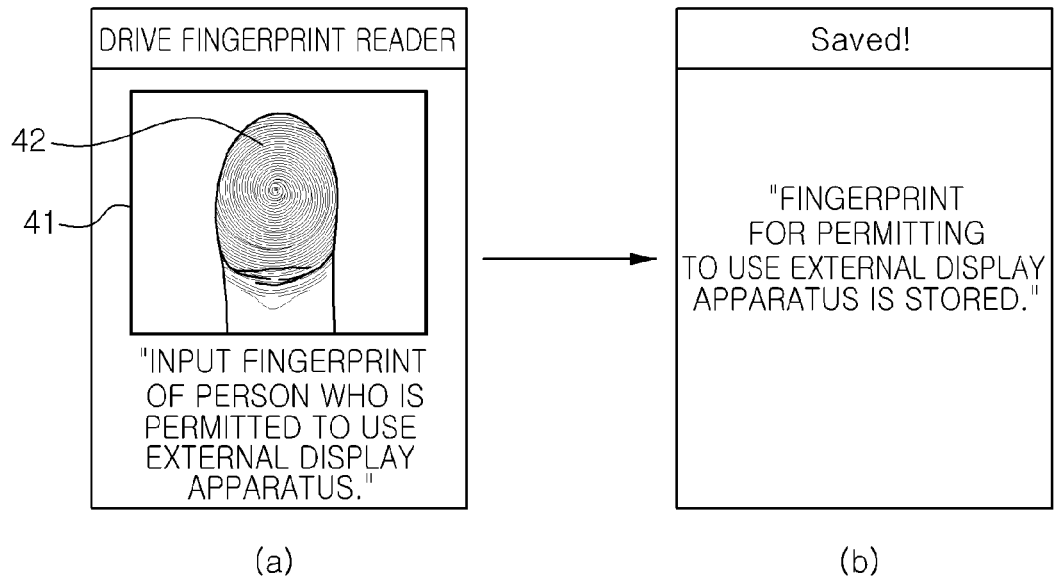
FIG. 10 is a screen state diagram showing a process of setting up fingerprint authorization information of a person who is permitted to use a display apparatus by using a fingerprint reader.

FIG. 10 is a screen state diagram showing a process of setting up fingerprint authorization information of a person who is permitted to use a display apparatus by using a fingerprint reader.

Referring to FIGS. 9 and 10, when a fingerprint authorization set-up menu 50 is selected from the input unit 120 (FIG. 5B), the control unit 150 drives the fingerprint reader 143 (S61) (FIG. 10A).

When a storing command of a fingerprint 42 is inputted (S62) while the fingerprint 42 of the person is inputted from the fingerprint reader 143 (FIG. 10A), the control unit 150 stores the fingerprint 42 in the memory 130 as the authorization information (S63) (FIG. 10B).

Figure 11:
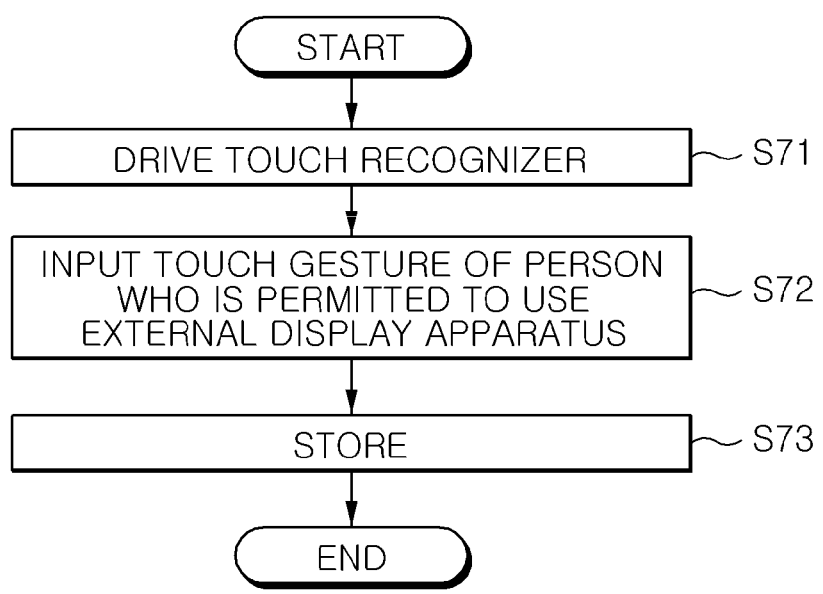
FIG. 11 is a flowchart showing a process of setting up touch gesture authorization information of a person who is permitted to use a display apparatus by using a touch screen.

FIG. 11 is a flowchart showing a process of setting up touch gesture authorization information of a person who is permitted to use a display apparatus by using a touch screen.

Figure 12:
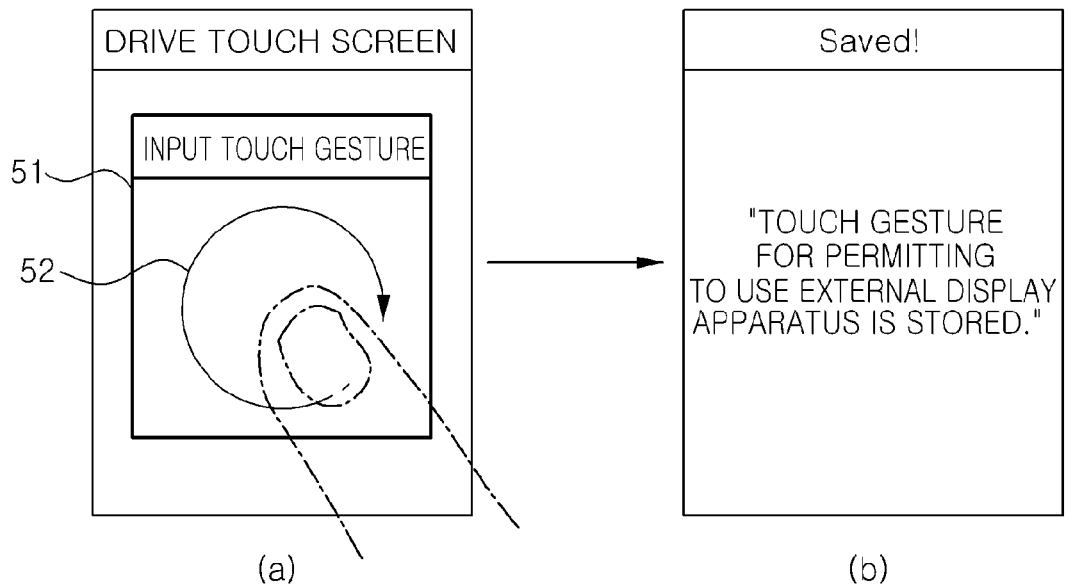
FIG. 12 is a screen state diagram showing a process of setting up touch gesture authorization information of a person who is permitted to use a display apparatus by using a touch screen.

FIG. 12 is a screen state diagram showing a process of setting up touch gesture authorization information of a person who is permitted to use a display apparatus by using a touch screen.

Referring to FIGS. 11 and 12, when a touch gesture authorization set-up menu 60 is selected from the input unit 120 (S60) (FIG. 5B), the control unit 150 drives a touch screen 144 (S71) (FIG. 12A).

When a storing command of a touch gesture 52 is inputted (S72) while the touch gesture 52 of the person having a predetermined pattern is inputted from the touch screen 144 (FIG. 12A), the control unit 150 stores the touch gesture 52 in the memory 130 as the authorization information (S73) (FIG. 12B).

Figure 13:
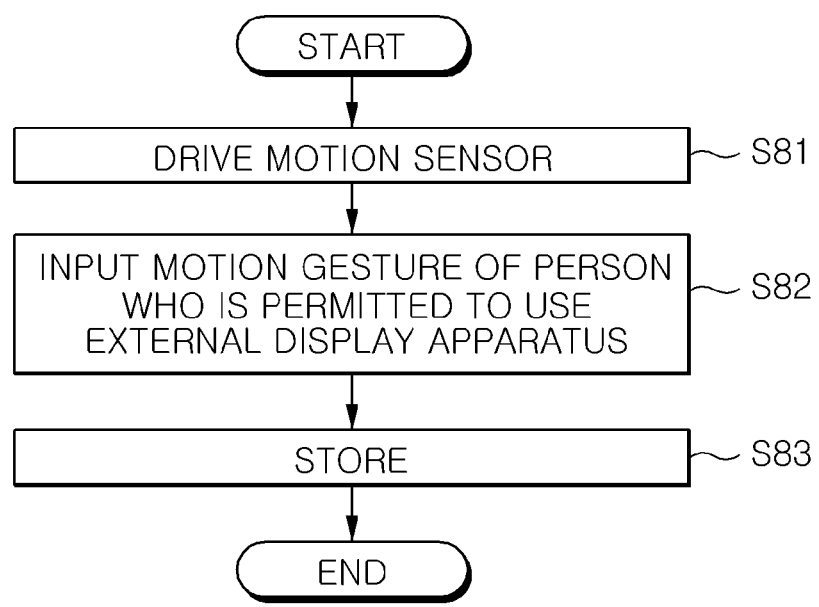
FIG. 13 is a flowchart showing a process of setting up motion gesture authorization information for a main body a terminal of a person who is permitted to use a display apparatus by using a motion sensor.

FIG. 13 is a flowchart showing a process of setting up motion gesture authorization information for a main body of a terminal of a person who is permitted to use a display apparatus by using a motion sensor.

Figure 14:
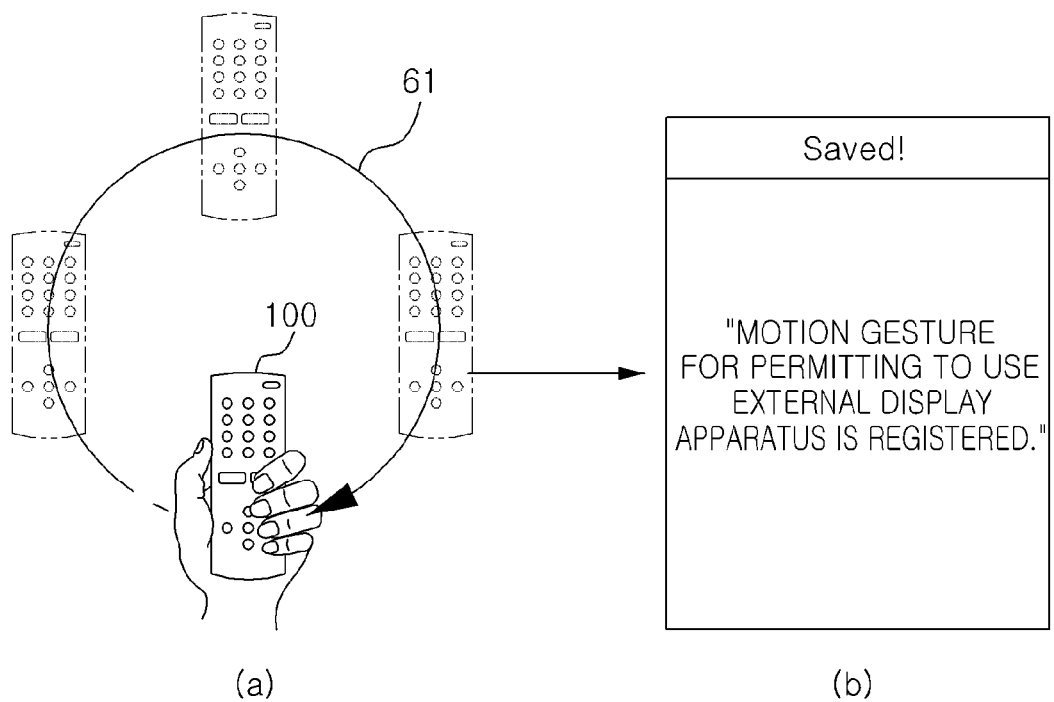
FIG. 14 is a screen state diagram showing a process of setting up motion gesture authorization information for a main body of a terminal of a person who is permitted to use a display apparatus by using a motion sensor.

FIG. 14 is a screen state diagram showing a process of setting up motion gesture authorization information for a main body of a terminal of a person who is permitted to use a display apparatus by using a motion sensor.

Referring to FIGS. 13 and 14, when a motion gesture authorization set-up menu 70 is selected from the input unit 120 (FIG. 5B), the control unit 150 drives the motion sensor 145 (S81) (FIG. 14A).

When a storing command of a motion gesture 62 is inputted (S82) while the motion gesture 62 of the person having a predetermined pattern for a main body of the terminal 100 is inputted from the motion sensor 145 (FIG. 14A), the control unit 150 stores the motion gesture 62 in the memory 130 as the authorization information (S83) (FIG. 14B).

As described above, the process of setting up the authorization information of the person who will be permitted to use the display apparatus 200 has been described in detail with reference to FIGS. 4 to 14.

Hereinafter, a process to limit and permit using the display apparatus 200 for a predetermined person by using authorization information which is set up in FIGS. 4 to 14 will be described in detail with reference to FIGS. 15 to 21.

Figure 15:
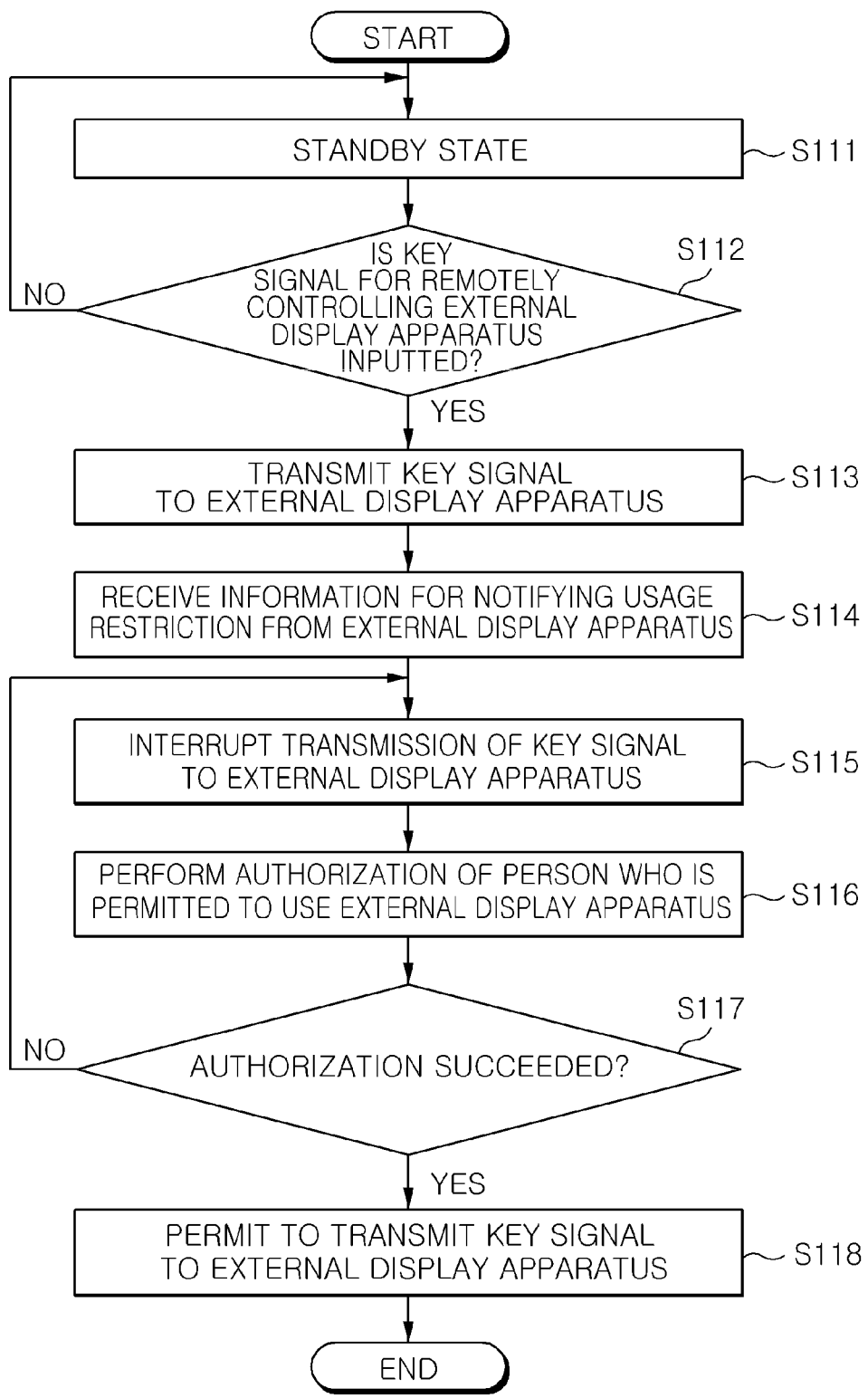

FIG. 15 is a flowchart showing a process for a terminal to limit and permit using a display apparatus according to an exemplary embodiment of the present invention.

FIGS. 16 to 21 are explanatory diagrams showing a process for a terminal to limit and permit using a display apparatus according to an exemplary embodiment of the present invention.

Referring to FIGS. 15 to 21, the control unit 150 receives a key signal for remotely controlling the display apparatus 200 from a predetermined person through the input unit 120 (S112) in a standby state (S111), and the control unit 150 transmits the key signal to the display apparatus 200 through a wireless communication unit 110 to remotely control an operation of the display apparatus 200 (S113).

In this case, when the control unit 150 receives information for notifying restriction of using the display apparatus 200 from the display apparatus 200 through the wireless communication unit 110 (S114), the control unit 150 controls the wireless communication unit 110 to interrupt transmission of the key signal generated from the input unit 120 (S115).

Subsequently, the control unit 150 drives an authorization unit 140 to authorize a person who presently grips the terminal 100 (S116).

In this case, when the control unit 150 succeeds in authorization of the person through the authorization unit 140 (S117), the control unit 150 cancels transmission interruption of the key signal generated from the input unit 120 by controlling the wireless communication unit 110 (S118).

That is, referring to FIG. 16, in the case of the terminal 100, when the authorization unit 140 receives a key signal corresponding to authorization information of a password set in the memory 130 from the person through the input unit 120 while transmission of the key signal of the input unit 120 to the display apparatus 200 is interrupted (FIG. 16A), the authorization unit 140 notifies an authorization success result 71 for the person to the control unit 150 and the control unit 150 cancels transmission interruption of the key signal generated from the input unit 120 by controlling the wireless communication unit 110 (FIG. 16B).

Next, referring to FIG. 17, in the case of the terminal 100, when the authorization unit 140 receives an image corresponding to the image authorization information set in the memory 130 through the camera 141 while transmission of the key signal of the input unit 120 to the display apparatus 200 is interrupted (FIG. 17A), the authorization unit 140 notifies the authorization success result 72 for the person to the control unit 150 and the control unit 150 cancels transmission interruption of the key signal generated from the input unit 120 by controlling the wireless communication unit 110 (FIG. 17B).

Subsequently, referring to FIG. 18, in the case of the terminal 100, when the authorization unit 140 receives a voice corresponding to the voice authorization information set in the memory 130 through the microphone 142 while transmission of the key signal of the input unit 120 to the display apparatus 200 is interrupted (FIG. 18A), the authorization unit 140 notifies the authorization success result 73 for the person to the control unit 150 and the control unit 150 cancels transmission interruption of the key signal generated from the input unit 120 by controlling the wireless communication unit 110 (FIG. 18B).

Besides, referring to FIG. 19, in the case of the terminal 100, when the authorization unit 140 receives a fingerprint corresponding to the fingerprint authorization information set in the memory 130 through the fingerprint reader 143 while transmission of the key signal of the input unit 120 to the display apparatus 200 is interrupted (FIG. 19A), the authorization unit 140 notifies an authorization success result 74 for the person to the control unit 150 and the control unit 150 cancels transmission interruption of the key signal generated from the input unit 120 by controlling the wireless communication unit 110 (FIG. 19B).

Further, referring to FIG. 20, in the case of the terminal 100, when the authorization unit 140 receives a touch gesture corresponding to the touch gesture authorization information set in the memory 130 through the touch screen 144 while transmission of the key signal of the input unit 120 to the display apparatus 200 is interrupted (FIG. 20A), the authorization unit 140 notifies an authorization success result 75 for the person to the control unit 150 and the control unit 150 cancels transmission interruption of the key signal generated from the input unit 120 by controlling the wireless communication unit 110 (FIG. 20B).

Lastly, referring to FIG. 21, in the case of the terminal 100, when the authorization unit 140 receives a motion gesture corresponding to the motion gesture authorization information set in the memory 130 through the touch screen 145 while transmission of the key signal of the input unit 120 to the display apparatus 200 is interrupted (FIG. 21A), the authorization unit 140 notifies an authorization success result 76 for the person to the control unit 150 and the control unit 150 cancels transmission interruption of the key signal generated from the input unit 120 by controlling the wireless communication unit 110 (FIG. 21B).

As described above, it will be apparent to those skilled in the art that the present invention can be implemented in predetermined other forms without departing from the spirit and essential feature of the present invention.

The present invention can be implemented in a medium in which a program is recorded as a computer-readable code. The computer-readable medium includes all types of recording apparatuses in which data readable by a computer system is stored. Examples of the computer-readable recording media include a ROM, a RAM, a CD-ROM, a magnetic tape, a floppy disk, an optical data storage, etc., and in addition, also include a recording medium implemented in the form of a carrier wave (for example, transmission through the Internet).

Accordingly, the detailed description should not limitatively be analyzed but considered as exemplification in all viewpoints. The scope of the present invention should be determined by reasonable analysis of the appended claims and all modifications within the equivalent scope are included in the scope of the present invention.

The terminal and the method for controlling thereof described above are not limited to the configuration and method of the embodiments as described above, but the embodiments may be configured by selectively combining all the embodiments or some of the embodiments so that various modifications can be made.

What is claimed is:

1. A terminal, comprising:
   an input unit generating a key signal for remotely controlling an external display apparatus;
   a wireless communication unit transmitting the key signal to the external display apparatus;
   a memory storing authorization information of a person who is permitted to use the external display apparatus;
   an authorization unit performing authorization of a predetermined person who is permitted to use the external display apparatus by using the authorization information stored in the memory; and
   a control unit permitting transmission of the key signal for remotely controlling the external display apparatus inputted from the input unit when the authorization is performed successfully through the authorization unit,
   wherein the control unit interrupts transmission of the key signal until the authorization is performed successfully when the authorization is failed,
   wherein the control unit interrupts transmission of the key signal inputted from the input unit when information for restriction of using the external display apparatus is received from the external display apparatus through the wireless communication unit,
   wherein the authorization information is a touch gesture of the person who is permitted to use the external display apparatus and the authorization unit includes a touch screen that receives a touch gesture of a person.

2. The terminal according to claim 1, wherein the authorization unit notifies the authorization success to the control unit when a touch gesture of a person inputted through the touch screen coincides with the touch gesture of the person who is permitted to use the external display apparatus.

3. A terminal comprising:
   an input unit generating a key signal for remotely controlling an external display apparatus;
   a wireless communication unit transmitting the key signal to the external display apparatus;
   a memory storing authorization information of a person who is permitted to use the external display apparatus;
   an authorization unit performing authorization of a predetermined person who is permitted to use the external display apparatus by using the authorization information stored in the memory; and
   a control unit permitting transmission of the key signal for remotely controlling the external display apparatus inputted from the input unit when the authorization is performed successfully through the authorization unit,
   wherein the control unit interrupts transmission of the key signal until the authorization is performed successfully when the authorization is failed,
   wherein the control unit interrupts transmission of the key signal inputted from the input unit when information for restriction of using the external display apparatus is received from the external display apparatus through the wireless communication unit,
   wherein the authorization information is a motion gesture of the person who is permitted to use the external display apparatus and the authorization unit includes a motion sensor that receives a motion gesture of a person.

4. The terminal according to claim 3, wherein the authorization unit notifies the authorization success to the control unit when a motion gesture of a person inputted through the motion sensor coincides with the motion gesture of the person who is permitted to use the external display apparatus.

* * * * *